(12) United States Patent
Yucek et al.

(10) Patent No.: US 9,794,091 B1
(45) Date of Patent: Oct. 17, 2017

(54) AGILE RADAR DETECTION FOR WIRELESS COMMUNICATIONS

(71) Applicant: QUALCOMM Incorporated, San Diego, CA (US)

(72) Inventors: Tevfik Yucek, San Jose, CA (US); Felix Bitterli, San Jose, CA (US); Shahram Abdollahi-Alibeik, Los Gatos, CA (US); Lalitkumar Nathawad, Pleasanton, CA (US); James Gardner, San Ramon, CA (US); Christopher Pisz, Parrish, FL (US); Patrick Kelliher, Chelmsford, MA (US); Burcin Baytekin, Milpitas, CA (US); Suresh Chandrasekaran, Kanchipuram (IN); Mani Krishnan Venkatachari, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/254,663

(22) Filed: Sep. 1, 2016

(51) Int. Cl.
*H04L 27/00* (2006.01)
*H04B 7/0413* (2017.01)
*H04L 12/933* (2013.01)

(52) U.S. Cl.
CPC ....... *H04L 27/0002* (2013.01); *H04B 7/0413* (2013.01); *H04L 49/101* (2013.01)

(58) Field of Classification Search
CPC .. H04B 7/0413; H04L 49/101; H04L 27/0002
See application file for complete search history.

(56) References Cited

U.S. PATENT DOCUMENTS

| | | | |
|---|---|---|---|
| 7,940,794 B2 | 5/2011 | Zhang et al. | |
| 8,432,826 B2 | 4/2013 | Heidari et al. | |
| 9,131,504 B2 | 9/2015 | Kenney et al. | |
| 9,226,270 B1 | 12/2015 | Zhang et al. | |
| 2014/0329481 A1* | 11/2014 | Chang | H04N 7/106 455/230 |
| 2015/0056936 A1 | 2/2015 | Rangarajan et al. | |
| 2015/0110058 A1* | 4/2015 | Shapira | H04B 1/3805 370/329 |

\* cited by examiner

*Primary Examiner* — Tuan Pham
(74) *Attorney, Agent, or Firm* — Paradice and Li LLP

(57) ABSTRACT

A method and apparatus are disclosed for a wireless communication device capable of scanning for radar signals while detecting and/or receiving a wireless communication signal. The wireless communication device may include a plurality of local oscillator synthesizers to allow distinct frequency bands to be used for wireless communication signals and radar detection. In some embodiments, the wireless communication device may include a radar detection physical layer (PHY) circuit to detect the presence of radar signals within a received RF signal. The radar detection PHY may have limited functionality suitable primarily for radar signal analysis and not suitable for processing (decoding) communication signals.

28 Claims, 4 Drawing Sheets

AGILE RADAR DETECTION FOR WIRELESS COMMUNICATIONS

TECHNICAL FIELD

The example embodiments relate generally to wireless communications, and specifically to detecting radar signals within operating frequencies used for wireless communications.

BACKGROUND OF RELATED ART

Wireless devices may share operating frequencies with radar devices within the 5 GHz frequency band. Portions of the shared 5 GHz frequency band may be referred to as a Dynamic Frequency Selection (DFS) frequency band. A wireless device following DFS protocols may vacate operations within portions of the shared frequency band when a radar signal, possibly from a radar device, is detected. DFS protocols allow the wireless device to switch the transmission and/or reception of wireless signals to other DFS frequencies after scanning for radar signals for a predetermined time period.

The predetermined time period, also referred to as a channel availability check (CAC) time period, is a minimum time period that a DFS frequency band is scanned for radar signals prior to wireless device operation. The CAC time period may delay initial operations as well as operations when a radar signal or other interference is detected in a currently selected DFS frequency band. This delay may negatively affect the user's experience as the user waits for the radar scan to complete.

Thus, there is a need to reduce operational delays associated with wireless devices operating in frequency bands shared with radar devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatuses and methods are disclosed for a wireless communication device capable of scanning for radar signals while detecting and/or receiving a wireless communication signal. In one example, a method of operating the wireless communication device is disclosed. The method may include coupling a first analog front-end to a first receive physical layer (PHY) block, coupling a second analog front-end to a radar detection block, searching for a radar signal via the radar detection block, and coupling the second analog front-end to a second receive PHY block responsive to detecting a wireless communication signal via the first receive PHY block.

In another example, a wireless device is disclosed. The wireless device may include a first analog front-end coupled to a first receive physical layer (PHY) block to detect a wireless communication signal, a second analog front-end coupled via a crossbar routing switch to a radar detection block to search for a radar signal, and a controller configured to cause the crossbar routing switch to couple the second analog front-end to a second receive PHY block responsive to a detection of the wireless communication signal by the first receive PHY block.

In another example, a wireless device is disclosed. The wireless device may include a transceiver, a processor, and a memory storing instructions that, when executed by the processor cause the wireless device to couple a first analog front-end to a first receive physical layer (PHY) block, couple a second analog front-end to a radar detection block, search for a radar signal via the radar detection block, and couple the second analog front-end to a second receive PHY block responsive to detecting a wireless communication signal via the first receive PHY block.

In another example, a non-transitory computer-readable storage medium is disclosed. The non-transitory computer-readable storage medium may store one or more programs containing instructions that, when executed by one or more processors of a wireless device, cause the wireless device to couple a first analog front-end to a first receive physical layer (PHY) block, couple a second analog front-end to a radar detection block, search for a radar signal via the radar detection block, and couple the second analog front-end to a second receive PHY block responsive to detecting a wireless communication signal via the first receive PHY block.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

Figure 1:
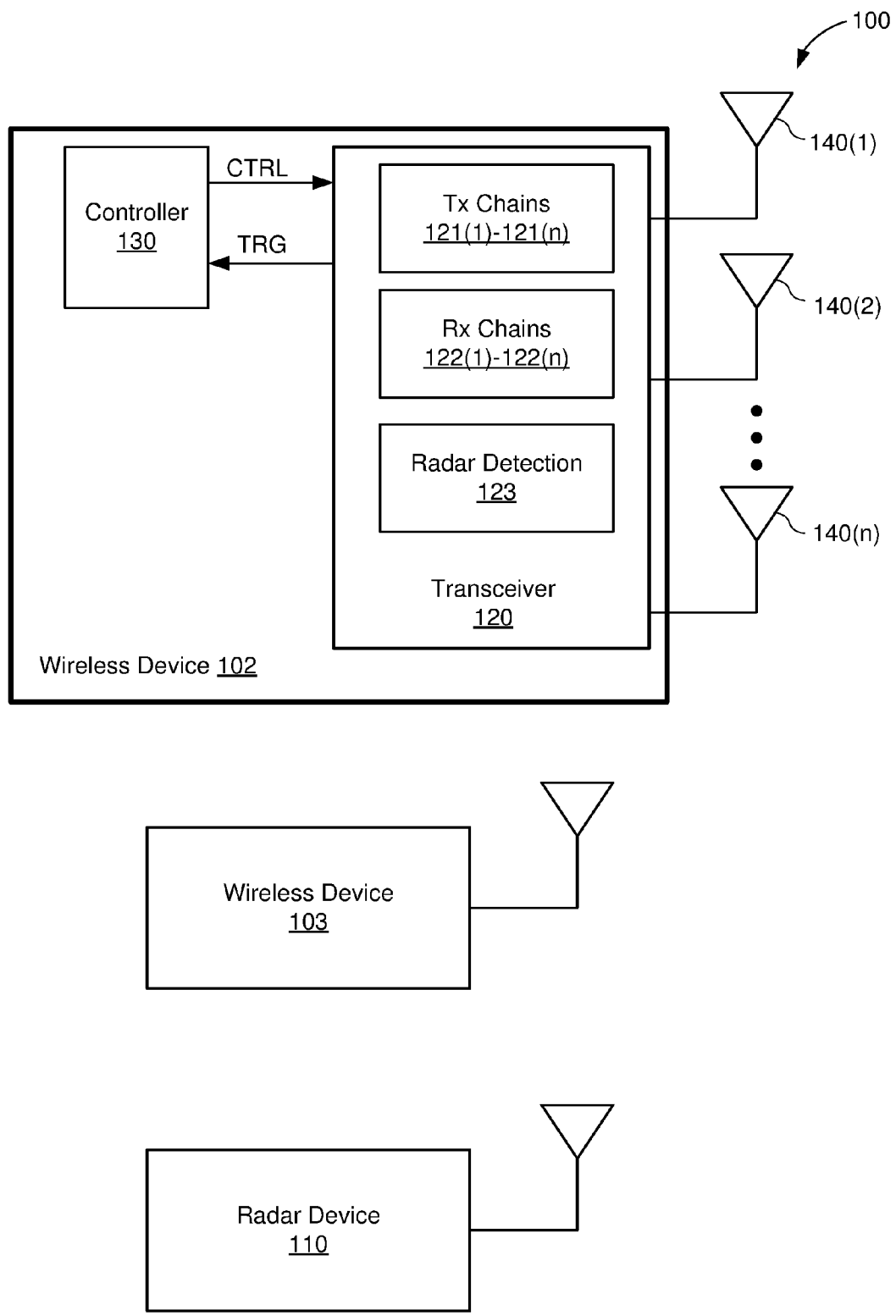
FIG. 1 depicts an example communication system within which example embodiments may be implemented.

A method and apparatus for detecting radar signals are disclosed. The example embodiments are described below in the context of Wi-Fi enabled devices for simplicity only. It is to be understood that the example embodiments are equally applicable for devices using signals of other various wireless standards or protocols. As used herein, the terms "wireless local area network (WLAN)" and "Wi-Fi" can include communications governed by the IEEE 802.11 standards (including standards describing multiple input/multiple output communications), HiperLAN (a set of wireless standards, comparable to the IEEE 802.11 standards, used primarily in Europe), and other technologies used in wireless communications.

In the following description, numerous specific details are set forth such as examples of specific components, circuits, and processes to provide a thorough understanding of the disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of myriad physical or logical mechanisms for communication between components. Further, the logic levels assigned to various signals in the description below are arbitrary, and therefore may be modified (e.g., reversed polarity) as desired. As another example, circuits described or depicted as including metal oxide semiconductor (MOS) transistors may alternatively be implemented using bipolar transistors or any other technology in which a signal-controlled current flow may be achieved. Also, signals referred to herein as clock signals may alternatively be strobe signals or any other signals that provide timing control. Accordingly, the example embodiments are not to be construed as limited to specific examples described herein but rather includes within its scope all embodiments defined by the appended claims.

In this disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout this disclosure, discussions utilizing the terms such as "initializing," "receiving," "sending," "using," "selecting," "determining," "normalizing," "multiplying," "averaging," "monitoring," "comparing," "applying," "updating," "measuring," "deriving" or the like, may refer to the actions and processes of a computer system or similar electronic computing device and/or circuit that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that may be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other suitable configuration.

FIG. 1 depicts an example communication system 100 within which example embodiments may be implemented. The communication system 100 includes wireless devices 102 and 103, and a radar device 110. In some embodiments, the wireless devices 102 and 103 may be any suitable Wi-Fi enabled wireless device including, for example, a cell phone, personal digital assistant (PDA), tablet device, laptop computer, or the like. The wireless devices 102 and 103 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some embodiments, each wireless device 102 and 103 may include one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 4. Although only two wireless devices 102 and 103 are shown in FIG. 1 for simplicity, it is to be understood that the communication system 100 may include any number of wireless devices. Similarly, although only one radar device 110 is shown, the communication system 100 may include any number of radar devices.

A communication channel may wholly or partially be included within a Dynamic Frequency Selection (DFS) frequency band. The wireless devices 102 and 103 may detect radar signals associated with (emanating from) the radar device 110 within the communication channel. Regulatory agencies have specified that when a wireless device detects a radar signal within a communication channel shared with a DFS frequency band, the wireless device is to cease operations within the communication channel. For example, if a radar signal is detected by the wireless device 102 within a frequency segment shared with a DFS frequency band, then operations within the communication channel may be terminated for a predetermined amount of time. Operations may not be resumed until a subsequent check for the radar signal is performed for a specified time period and no radar signals are detected within the communication channel.

The wireless device 102 may include a transceiver 120, a controller 130, and a number n antennas 140(1)-140(n). The transceiver 120 may transmit and receive wireless communication signals (e.g., Wi-Fi signals) through the communication channel via the antennas 140(1)-140(n). The transceiver 120 may include n transmit (Tx) chains 121(1)-121(n), n receive (Rx) chains 122(1)-122(n), and a radar detection block 123. The n Tx chains 121(1)-121(n) may include circuits to, for example, process (e.g., encode, modulate, and/or amplify) data to be transmitted through the antennas 140(1)-140(n).

The n Rx chains 122(1)-122(n) may include circuits to, for example, process (e.g., amplify, demodulate, and/or decode) data received via the antennas 140(1)-140(n). Although the wireless device 102 includes n antennas 140(1)-140(n), n Tx chains 121(1)-121(n), and n Rx chains 122(1)-122(n), in other embodiments, the wireless device 102 may include different numbers of antennas, Tx chains, and Rx chains. For example, another example embodiment of a wireless device may include a number m antennas, a number p Tx chains, and a number r Rx chains, where p may be less than or equal to m (p<=m), and r may be less than or equal to m (r<=m). In still other example embodiments, p may be greater than m (p>m), and r may be greater than m (r>m). In still other embodiments, the Tx chains 121(1)-121(n), the Rx chains 122(1)-122(n), and the radar detection block 123 may be coupled to the antennas 140(1)-140(n) through antenna selection circuitry (not shown for simplicity). The antenna selection circuitry may operate as a configurable coupler to allow various antennas to be coupled to various Tx chains 121(1)-121(n) and/or Rx chains 122(1)-122(n).

The radar detection block 123 may detect radar signals within frequency bands used by the wireless device 102. For example, radio frequency (RF) signals may be received within DFS frequency bands by the Rx chains 122(1)-122(n). The radar detection block 123 may examine the RF signals and/or signal characteristics associated with the RF signals to identify radar signals.

The wireless device 102 may also include the controller 130 to control operations of the wireless device 102 and/or the transceiver 120. For example, the controller 130 may select an operational mode and provide transmit data to the transceiver 120. In some embodiments, the radar detection block 123 may generate a trigger signal (TRG) indicating whether radar signals are present. The controller 130 may control wireless transmission and/or reception operations of transceiver 120 based on the trigger signal TRG. For example, when the trigger signal TRG indicates that radar signals are present, the controller 130 may instruct transceiver 120 through a control signal (CTRL) to stop transmitting Wi-Fi signals. Thereafter, when the trigger signal TRG indicates that radar signals are no longer present (after a minimum non-occupancy period), the controller 130 may instruct the transceiver 120 through the control signal CTRL to resume transmitting Wi-Fi signals. Although not shown for simplicity, the wireless device 103 may also include a transceiver and a controller similar to the transceiver 120 and the controller 130.

In accordance with at least some example embodiments, the controller 130 may cause wireless device 102 to selectively switch between a first mode of operation and a second mode of operation based, for example, on the CTRL signal. For some implementations, the transceiver 120 may be configured to search for and/or detect radar signals when the wireless device 102 is in the first mode of operation, and the transceiver 120 may be configured to transmit and/or receive wireless signals when the wireless device 102 is in the second mode of operation. In some aspects, the controller 130 may selectively drive the CTRL signal to either a first state or a second state, where the first state of the CTRL signal causes the wireless device 102 to operate in the first mode of operation and the second state of the CTRL signal causes the wireless device 102 to operate in the second mode of operation. More specifically, the controller 130 may drive the CTRL signal to the first state and thereby cause the transceiver 120 to search for and/or detect radar signals (e.g., rather than to transmit wireless communication signals). Conversely, the controller 130 may drive the CTRL signal to a second state and thereby cause the transceiver 120 to transmit and/or receive wireless communication signals (e.g., rather than to search for and/or detect radar signals).

For other implementations, when the wireless device 102 operates in the first mode of operation, the transceiver 120 may use a selected number of the Rx chains 122(1)-122(n) to look for and detect a presence of radar signals, and may use the remaining number of the Rx chains 122(1)-122(n) (e.g., the non-selected Rx chains 122) to receive wireless communication signals. In this manner, the wireless device 102 may search for radar signals while concurrently receiving one or more wireless communication signals when operating in the first mode of operation. When the wireless device 102 operates in the second mode of operation, the transceiver 120 may use all of the Tx chains 121(1)-121(n) and/or all of the Rx chains 122(1)-122(n) to transmit and/or receive wireless communication signals. In this manner, the wireless device 102 may use all available transceiver resources to transmit and/or receive wireless communication signals when operating in the second mode of operation.

In some embodiments, the controller 130 may selectively assert the CTRL signal to cause the wireless device 102 to switch from the first mode of operation to the second mode of operation in response to detecting a wireless communication signal. For example, the controller 130 may drive the CTRL signal to the first state to cause the wireless device 102 to operate in the first mode of operation to search for radar signals and possibly detect and/or receive wireless communication signals. If a wireless communication signal is detected, the controller 130 may drive the CTRL signal to the second state to cause the wireless device 102 to operate in the second mode of operation, particularly when all of the Rx chains 122(1)-122(n) are needed to receive the wireless communication signal.

Figure 2:
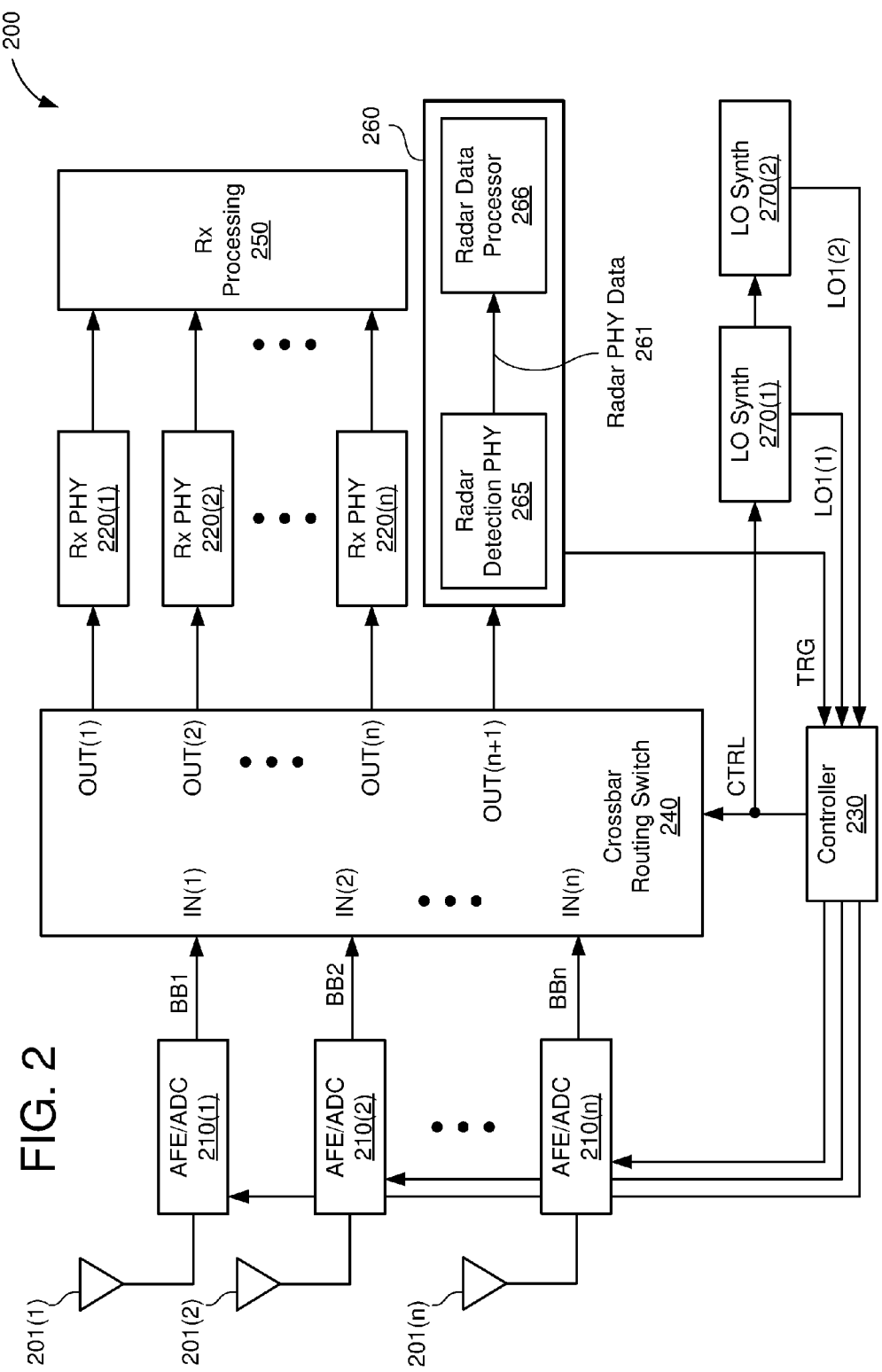
FIG. 2 is a block diagram of a transceiver that may be one embodiment of the transceiver of FIG. 1, in accordance with example embodiments.

FIG. 2 is a block diagram of a transceiver 200 that may be one embodiment of the transceiver 120 of FIG. 1, in accordance with example embodiments. For simplicity of explanation, some elements and/or blocks, such as those associated with RF signal transmission, may be omitted from FIG. 2. The transceiver 200 may include n analog front-end/analog-to-digital converter (AFE/ADC) blocks 210(1)-210(n), n Rx physical layer (PHY) blocks 220(1)-220(n), n antennas 201(1)-201(n), a controller 230, a crossbar routing switch 240, a Rx processing block 250, a radar detection block 260, a first local oscillator (LO) synthesizer 270(1), and a second LO synthesizer 270(2). Although this example embodiment includes n AFE/ADC blocks 210(1)-210(n) and n Rx PHY blocks 220(1)-220(n), in other embodiments, the number of AFE/ADC blocks may differ from the number of Rx PHY blocks. The radar detection block 260 may be one embodiment of the radar detection block 123 of FIG. 1. The controller 230 may be one embodiment of the controller 130 of FIG. 1. The AFE/ADC blocks 210(1)-210(n) and the Rx PHY blocks 220(1)-220(n) may be one embodiment of the Rx chains 122(1)-122(n) of FIG. 1.

Each AFE/ADC block 210(1)-210(n) may be coupled to a respective one of antennas 201(1)-201(n), for example, to receive RF signals from the antennas 201(1)-201(n). Further, each AFE/ADC block 210(1)-210(n) may include one or more low noise amplifiers (LNAs), filters, mixers, etc. (not shown for simplicity) to receive, amplify, demodulate, and/or process the RF signals. Each AFE/ADC block 210(1)-210(n) may also include an analog-to-digital converter (also not shown for simplicity) to digitize the processed RF signal and generate a digital baseband signal. The digital baseband signal from each AFE/ADC block 210(1)-210(n) may be routed to a corresponding input port (IN(1)-IN(n)) of the crossbar routing switch 240. For example, a first digital baseband signal BB1 may be routed from AFE/ADC block 210(1) to the first input IN(1) of crossbar routing switch 240, a second digital baseband signal BB2 may be routed from AFE/ADC block 210(2) to the second input IN(2) of crossbar routing switch 240, and an $n^{th}$ digital baseband signal BBn may be routed from AFE/ADC block 210(n) to the $n^{th}$ input IN(n) of crossbar routing switch 240.

Each Rx PHY block 220(1)-220(n) may be coupled to a corresponding output (OUT(1)-OUT(n)) of the crossbar routing switch 240 to receive the digital baseband signal generated by at least one of the AFE/ADC blocks 210(1)-210(n). Each Rx PHY block 220(1)-220(n) may include decoders, error correction circuits, Fast Fourier Transform (FFT) circuits, etc. to recover, at least partially, data from the digital baseband signal. The Rx PHY blocks 220(1)-220(n) may be coupled to the Rx processing block 250 to further process and/or combine the data transmitted from another wireless device and received by transceiver 200. For example, n-data streams from n Rx PHY blocks 220(1)-220(n) may be processed and/or combined by the Rx processing block 250 to recover data transmitted from the other wireless device.

In some embodiments, one or more of the n-data streams provided by the n Rx PHY blocks 220(1)-220(n) may form at least a portion of a multiple-input multiple-output (MIMO) data transmission. In other embodiments, one or more of the n-data streams may be associated with different frequency bands that may be used for Wi-Fi communications as set forth by one of the 802.11 specifications such as, but not limited to, the 802.11a specification, the draft 802.11ac specification, and/or the draft 802.11ax specification. In one example, one or more of the n-data streams provided by Rx PHY blocks 220(1)-220(n) may be associated with a 20 MHz frequency band. If the transceiver 200 includes eight AFE/ADC blocks and eight corresponding Rx PHY blocks (e.g., n=8), then the transceiver 200 may support a 160 MHz operational mode. By using different numbers of AFE/ADC and Rx PHY blocks, different operational modes may be supported by the transceiver 200.

The first LO synthesizer 270(1) and the second LO synthesizer 270(2) may generate LO output signals that may be used to determine receive (e.g., carrier) frequencies associated with the received RF signals. Although two LO synthesizers are depicted here, in other embodiments, the transceiver 200 may include more than two LO synthesizers. LO output signals generated by the LO synthesizers 270(1)-270(2) may be used, for example, by mixers within the AFE/ADC blocks 210(1)-210(n) to demodulate received RF signals. In some embodiments, the first LO synthesizer 270(1) may generate a first LO output signal LO(1) to receive RF signals through one or more Wi-Fi channels, and the second LO synthesizer 270(2) may generate a second LO output signal LO(2) to search for radar signals within other Wi-Fi channels. In some aspects, the first LO output signal LO(1) may be different from the second LO output signal LO(2) in frequency and/or phase.

The radar detection block 260 is coupled to an output (OUT(n+1)) of the crossbar routing switch 240 and may detect the presence of radar signals within a digital baseband signal. The radar detection block 260 may receive the digital baseband signal generated by at least one of the AFE/ADC blocks 210(1)-210(n). The radar detection block 260 may include a radar detection PHY 265 and a radar data processor 266. The radar detection PHY 265 may include one or more filters, processing circuits, and/or FFT circuits (not shown for simplicity) to generate radar PHY data 261 for radar signal detection analysis. The radar detection PHY 265 may have limited functionality compared to the Rx PHY blocks 220(1)-220(n). For example, the radar detection PHY 265 may have sufficient circuits to generate radar PHY data 261, but insufficient circuits to recover data transmitted from other wireless devices. The radar PHY data 261 may be analyzed by the radar data processor 266. The radar data processor 266 may detect the presence of a radar signal within a frequency band associated with the digital baseband signal received by the radar detection block 260. In this manner, the radar detection block 260 may be used to determine whether any radar signals are present within wireless communication signals received by transceiver 200 of wireless device 102.

In some embodiments, a radar signal may be detected and/or identified by examining amplitude, timing, phase, and/or frequency characteristics associated with a received RF signal. For example, the radar data processor 266 may match the amplitude, timing, phase, and/or frequency characteristics associated with the received RF signal to similar characteristics of known radar signals. Thus, time domain (amplitude, repetition period) and/or frequency domain (phase, frequency) analysis may be used to detect and/or identify radar signals.

The crossbar routing switch 240 may be configured to route data from any input port IN(0)-IN(n) to any output port OUT(0)-OUT(n+1), for example, based on the CTRL signal provided by the controller 230. In some embodiments, the crossbar routing switch 240 may include more output ports than input ports to provide flexible configurations to support, for example, MIMO or multi-data stream reception and concurrent radar detection.

For example, when the wireless device 102 operates in the first mode of operation (e.g., to search for radar signals), the crossbar routing switch 240 may be configured to couple one of the AFE/ADC blocks 210(1)-210(n) to the radar detection block 260. In this manner, the radar detection block 260 may analyze the digital baseband signal from the selected AFE/ADC block and determine if a radar signal is present within the associated Wi-Fi channel.

When the wireless device 102 operates in the second mode of operation (e.g., to transmit and/or receive wireless communication signals), an n-data stream wireless communication signal may be received by configuring the crossbar routing switch 240 to couple each of the n AFE/ADC blocks 210(1)-210(n) to a respective one of then Rx PHY blocks 220(1)-220(n). In this manner, any wireless communication signal transmitted as n or fewer data streams may be received by the transceiver 200. The number of data streams received by transceiver 200 may be limited by the number of AFE/ADC blocks 210(1)-210(n) and/or Rx PHY blocks 220(1)-220(n) that are available.

For at least some implementations, when the wireless device 102 operates in the first mode of operation, the transceiver 200 may be configured to receive a wireless communication signal while concurrently searching for a radar signal. For example, a selected one of the n AFE/ADC blocks 210(1)-210(n) may be coupled to the radar detection block 260 and used to detect a presence of radar signals, and a remaining number of the AFE/ADC blocks 210(1)-210(n) (e.g., (n−1) of the AFE/ADC blocks 210) may be coupled to the Rx PHY blocks 220(1)-220(n) and used to detect and/or receive an incoming wireless communication signal. In this configuration, some of the available AFE/ADC blocks 210(1)-210(n) and respective ones of the Rx PHY blocks 220(1)-220(n) may be used to detect and receive incoming wireless communication signals, while at least one of the available AFE/ADC blocks 210(1)-210(n) and the radar detection block 260 may be used to concurrently detect a radar signal. In this manner, a search for a wireless communication channel without radar signals may be performed for extended periods of time while concurrently detecting or receiving an incoming wireless communication signal.

When an incoming wireless communication signal is detected, particularly a wireless communication signal that may require all of the AFE/ADC blocks 210(1)-210(n) and all of the Rx PHY blocks 220(1)-220(n), then the crossbar routing switch 240 may be reconfigured (e.g., based on the CTRL signal indicating the second mode of operation) so that all the AFE/ADC blocks 210(1)-210(n) are coupled to respective ones of the Rx PHY blocks 220(1)-220(n). Thus, when the wireless device 102 is in the second mode of operation, the transceiver 200 may be used to receive one or more wireless communication signals, and the radar detection block 260 may not receive digital baseband signals from one of the AFE/ADC blocks 210(1)-210(n). Searching for radar signals may be temporarily suspended while receiving the one or more wireless communication signals.

In some embodiments, the crossbar routing switch 240 may be reconfigured (e.g., based on the CTRL signal indicating the second mode of operation) to receive the one or more wireless communication signals while a short training field is being received. For example, when a wireless communication signal is detected before a short training field is received, the crossbar routing switch 240 may be reconfigured during reception of the short training field to allow the wireless communication signal to be received.

The controller 230 may be coupled to the AFE/ADC blocks 210(1)-210(n), the crossbar routing switch 240, the first LO synthesizer 270(1), the second LO synthesizer 270(2), and the radar detection block 260. The controller 230 may configure the crossbar routing switch 240 to selectively route digital baseband signals from the AFE/ADC blocks 210(1)-210(n) to the Rx PHYs blocks 220(1)-220(n) and to the radar detection block 260 based on the CTRL signal. The controller 230 may also control operations of the first LO synthesizer 270(1) and the second LO synthesizer 270(2) based on the CTRL signal.

For example, when the wireless device 102 operates in the first mode of operation, the controller 230 may configure the first LO synthesizer 270(1) to generate the first LO output signal LO(1) in a manner suitable for detecting and/or receiving wireless communication signals, and may configure the second LO synthesizer 270(2) to generate the second LO output signal LO(2) in a manner suitable for detecting and/or searching for radar signals. In some aspects, the controller 230 may cause the wireless device 102 to enter the second mode of operation in response to detecting and/or receiving a wireless communication signal, and may configure the first LO synthesizer 270(1) and/or the second LO synthesizer 270(2) to generate waveforms for respective signals LO(1) and LO(2) suitable for allowing different Wi-Fi channels to be used for wireless communication signals.

Conversely, when the wireless device 102 operates in the second mode of operation, the controller 230 may configure the first LO synthesizer 270(1) to generate the first LO output signal LO(1) in a manner suitable for transmitting and/or receiving wireless communication signals, and may configure the second LO synthesizer 270(2) to generate the second LO output signal LO(2) in a manner suitable for transmitting and/or receiving wireless communication signals. In some aspects, the first LO output signal LO(1) may be used for receiving wireless communication signals (e.g., to down-convert received wireless communication signals from a carrier frequency to a baseband frequency), and the second LO output signal LO(2) may be used for transmitting wireless communication signals (e.g., to up-convert baseband signals to the carrier frequency). In other aspects, the first LO output signal LO(1) may be used for transmitting wireless communication signals (e.g., to up-convert baseband signals to the carrier frequency), and the second LO output signal LO(2) may be used for receiving wireless communication signals (e.g., to down-convert received wireless communication signals from the carrier frequency to the baseband frequency). In still other aspects, the first LO output signal LO(1) and the second LO output signal LO(2) may be used for transmitting and/or receiving wireless communication signal with two or more carrier frequencies.

As discussed above, when the wireless device 102 operates in the first mode of operation, one of LO synthesizers 270(1)-270(2) may be used for detecting radar signals while the other of LO synthesizers 270(1)-270(2) may be used for receiving wireless communication signals; when the wireless device 102 operates in the second mode of operation, the LO synthesizers 270(1)-270(2) may be used for transmitting and/or receiving wireless communication signals. By selectively allocating one of the LO synthesizers 270(1)-270(2) normally used for transmitting or receiving wireless communication signals (e.g., in the second mode of operation) for detecting a presence of radar signals (e.g., in the first mode of operation), the example embodiments may allow wireless device 102 to selectively search for radar signals without the need for an additional or dedicated LO synthesizer.

Similarly, when the wireless device 102 operates in the first mode of operation, one of the AFE/ADC blocks 210(1)-210(n) and the radar detection block 260 may be used for detecting radar signals while the other AFE/ADC blocks 210(1)-210(n) and the Rx PHY blocks 220(1)-220(n) may be used for receiving wireless communication signals; when the wireless device 102 operates in the second mode of operation, all of the AFE/ADC blocks 210(1)-210(n) and all of the Rx PHY blocks 220(1)-220(n) may be used for receiving wireless communication signals. By selectively allocating one of the AFE/ADC blocks 210(1)-210(n) normally used for receiving wireless communication signals (e.g., in the second mode of operation) for detecting a presence of radar signals (e.g., in the first mode of operation), the example embodiments may allow wireless device 102 to selectively search for radar signals without the need for an additional or dedicated AFE/ADC block 210.

In some embodiments, automatic gain control circuitry (not shown for simplicity) may be included within the Rx PHY blocks 220(1)-220(n) and/or the radar detection block 260. Thus, separate automatic gain controls may be maintained for receiving wireless communication signals and for searching for radar signals.

Figure 3:
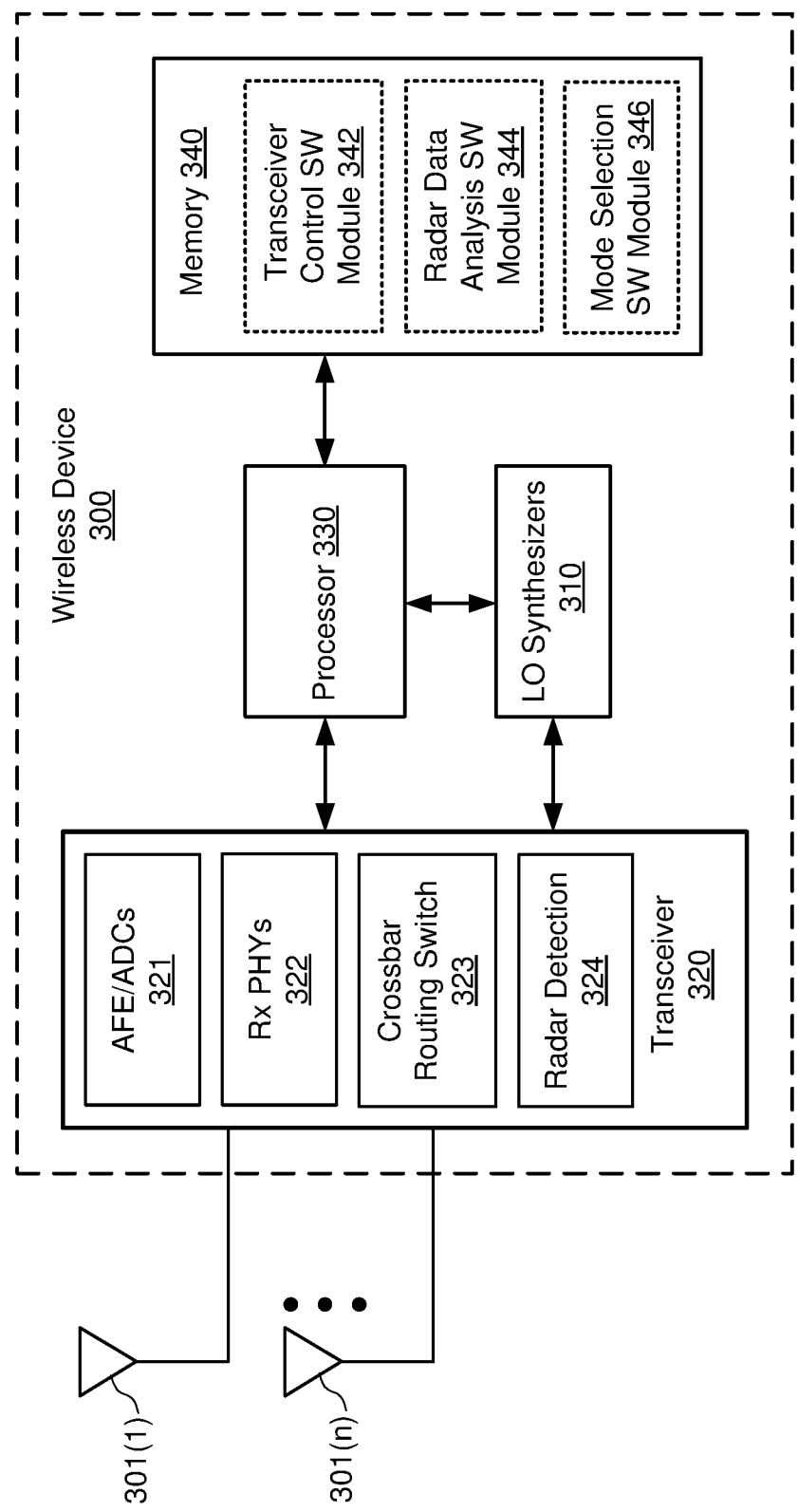
FIG. 3 depicts a wireless device that may be one embodiment of the wireless devices of FIG. 1.

FIG. 3 depicts a wireless device 300 that may be an embodiment of the wireless devices 102 and/or 103 of FIG. 1. The wireless device 300 may include antennas 301(1)-301(n), LO synthesizers 310, a transceiver 320, a processor 330, and a memory 340. The transceiver 320 may be coupled to the antennas 301(1)-301(n), either directly or through an antenna selection circuit (not shown for simplicity). The transceiver 320 may receive and/or transmit signals, and communicate with other wireless devices through a communication channel. In some embodiments, the transceiver 320 may include some or all of the elements of the transceivers 120 and 200 described above with respect to FIGS. 1 and 2, respectively. For example, the transceiver 320 may include AFE/ADC blocks 321, Rx PHY blocks 322, a crossbar routing switch 323, and a radar detection block 324. Similar to the AFE/ADC blocks 210(1)-210(n) of FIG. 2, the AFE/ADC blocks 321 of FIG. 3 may include n AFE/ADC blocks. Further, similar to the Rx PHY blocks 220(1)-220(n) of FIG. 2, the Rx PHY blocks 322 of FIG. 3 may include n Rx PHY blocks. In some embodiments, the AFE/ADC blocks 321 and the Rx PHY blocks 322 may receive and process signals, including MIMO data signals, received via antennas 301(1)-301(n). In other embodiments, the AFE/ADC blocks 321 and the Rx PHY blocks 322 may receive n-data streams associated with different frequency bands. The LO synthesizers 310 may include two or more LO synthesizers, similar to first LO synthesizer 270(1) and second LO synthesizer 270(2) of FIG. 2, to generate LO output signals for the AFE/ADC blocks 321.

Memory 340 may include a non-transitory computer-readable storage medium (e.g., one or more nonvolatile memory elements, such as EPROM, EEPROM, Flash memory, a hard drive, etc.) that may store the following software modules:

- a transceiver control software module 342 to control the transceiver 320 and the LO synthesizers 310;
- a radar data analysis software module 344 to examine data from the radar detection block 324 and identify radar signals; and
- a mode selection software module 346 to selectively switch an operation of the wireless device 300 between a first mode of operation and a second mode of operation based, at least in part, on an indication of a presence of a radar signal. Each software module includes program instructions that, when executed by processor 330, may cause wireless device 300 to perform the corresponding function(s). Thus, the non-transitory computer-readable storage medium of memory 340 may include instructions for performing all or a portion of the operations of FIG. 4.

The processor 330, which is coupled to the transceiver 320 and the memory 340, may be any suitable processor or processors capable of executing scripts or instructions of one or more software programs stored in the wireless device 300 (e.g., within the memory 340).

The processor 330 may execute the transceiver control software module 342 to control and configure the transceiver 320 and the LO synthesizers 310. For example, executing the transceiver control software module 342 may configure the LO synthesizers 310 to generate LO output signals to allow one or more wireless communication signals and/or radar signals to be concurrently received through Wi-Fi channels by the AFE/ADC blocks 321 and the Rx PHY blocks 322. Executing the transceiver control software module 342 may also configure the crossbar routing switch 323 to route digital baseband signals from one or more AFE/ADC blocks 321 to one or more Rx PHY blocks 322 and/or the radar detection block 324. In some embodiments, executing the transceiver control software module 342 may configure the crossbar routing switch 323 to route digital baseband signals away from the radar detection block 324 and to the Rx PHY blocks 322 when a short training field is received by AFE/ADC blocks 321. Executing the transceiver control software module 324 may also configure the LO synthesizers to generate different LO output signals in response to a detected radar signal.

The processor 330 may execute the radar data analysis software module 344 to determine if a radar signal is present within a Wi-Fi channel. Executing the radar data analysis software module 344 may allow the processor 330 to examine time domain and/or frequency domain information provided by the radar detection block 324 to identify radar signals.

The processor 330 may execute the mode selection software module 346 to selectively switch an operation of the wireless device 300 between a first mode of operation and a second mode of operation based, at least in part, on an indication of a presence of a radar signal. In some aspects, the wireless device 300 may search for or detect a radar signal while concurrently receiving a wireless communication signal when operating in the first mode of operation, and the wireless device 300 may transmit and/or receive one or more wireless communication signals when operating in the second mode of operation.

Figure 4:
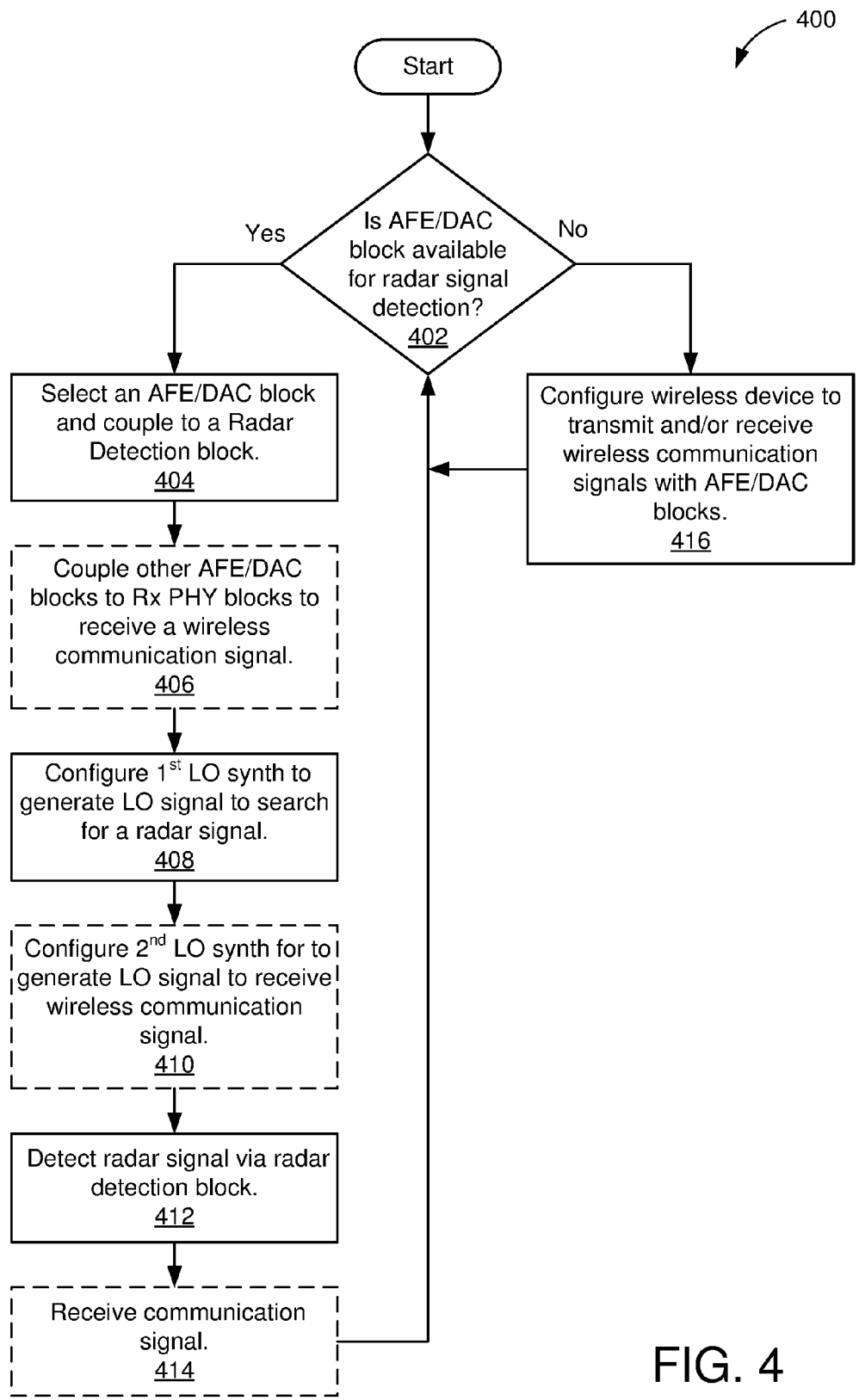
FIG. 4 shows an illustrative flow chart depicting an example operation for searching for a radar signal in accordance with example embodiments.

FIG. 4 shows an illustrative flow chart depicting an example operation 400 for searching for a radar signal in accordance with example embodiments. Some embodiments may perform the operations described herein with additional operations, fewer operations, operations in a different order, operations in parallel, and/or some operations differently. Referring also to FIG. 3, a determination of whether an AFE/ADC block is available for radar signal detection is made (402). An AFE/ADC block may be available for radar signal detection if all available AFE/ADC blocks (from AFE/ADC blocks 321) are not used to detect and/or receive a wireless communication signal. In a first example, the wireless device 300 may receive a wireless communication signal having four data streams by using four AFE/ADC blocks. However, if the wireless device 300 has more than four AFE/ADC blocks, then at least one AFE/ADC block may be available for radar signal detection. In another example, the wireless device 300 may detect and/or receive an n-data stream wireless communication signal through (n−1) AFE/DAC blocks and (n−1) Rx PHY blocks. Therefore, at least one AFE/DAC block may be available for radar signal detection. In yet another example, the wireless device 300 may transmit a wireless communication signal while not saturating or otherwise affecting the operation of the AFE/ADC blocks 321, thereby allowing at least one AFE/ADC block to remain available for detecting radar signals.

If there is an AFE/ADC block available for radar signal detection (as tested at 402), then an AFE/ADC block is selected and coupled to a radar detection block (404). As described above with respect to FIG. 3, the crossbar routing switch 323 may be configured to route a digital baseband signal from the selected AFE/ADC block to the radar detection block 324.

Next, in an optional operation, the other AFE/ADC blocks (e.g., the AFE/ADC blocks not selected for radar signal detection) may be coupled to Rx PHY blocks 322 to detect and/or receive a wireless communication signal (406). (Optional operations are indicated with dashed lines in FIG. 4). The crossbar routing switch 323 may be configured to couple one or more of the other AFE/ADC blocks 321 to one or more Rx PHY blocks 322 to allow wireless communication signals to be received and processed, for example, while concurrently searching for radar signals using the selected AFE/ADC block and the radar detection block 324.

Next, a first LO synthesizer is configured to generate an LO output signal for the selected AFE/ADC block, for example, so that the selected AFE/ADC block may be used to search for a radar signal (408). As described above with respect to FIG. 3, a first LO synthesizer (from LO synthesizers 310) may generate a first LO output signal that may be associated with a Wi-Fi channel and/or a carrier frequency used by the selected AFE/ADC block to receive (demodulate) RF signals, such as a radar signal.

Next, in an optional operation, a second LO synthesizer is configured to generate a second LO output signal for the other AFE/ADC blocks, for example, so that the other AFE/ADC block may be used to detect and/or receive a wireless communication signal (410). The second LO output signal may be different from the first LO output signal to allow different frequencies and/or Wi-Fi channels to be scanned while receiving wireless communication signals.

Next, radar signals are detected via the radar detection block (412). For example, the radar detection block 324 may examine signal characteristics (e.g., time domain and/or frequency domain signal characteristics) associated with the digital baseband signal to identify radar signals received through the selected AFE/ADC block.

Next, in an optional operation, the wireless communication signal is received (414). In some embodiments, one or more wireless communication signals may be detected and/or received while scanning for radar signals with the selected AFE/ADC block and the radar detection block 324. Operation proceeds to 402.

If there are no AFE/ADC blocks available for radar signal detection (as tested at 402), then the wireless device 300 may be configured to transmit and/or receive wireless communication signals with some or all of the AFE/ADC blocks 321 and some or all of the Rx PHY blocks 322 (416). Thus, the crossbar routing switch 323 may be configured to couple one or more AFE/ADC blocks 321 to one or more Rx PHYs 322 to allow one or more wireless communication signals to be received. Operations proceed to 402.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for operating a wireless device, the method comprising:
   coupling a first analog front-end to a first receive physical layer (PHY) block;
   coupling, by a crossbar routing switch, a second analog front-end to a radar detection block;
   searching for a radar signal via the radar detection block; and
   coupling, by the crossbar routing switch, the second analog front-end to a second receive PHY block responsive to detecting a wireless communication signal via the first receive PHY block.

2. The method of claim 1, further comprising:
   receiving the wireless communication signal via the first analog front-end and the second analog front-end, wherein the first analog front-end receives a first data stream of the wireless communication signal and the second analog front-end receives a second data stream of the wireless communication signal.

3. The method of claim 2, wherein the first data stream and the second data stream comprise at least a portion of a multiple-input multiple-output (MIMO) data stream.

4. The method of claim 1, wherein the second analog front-end is coupled to the radar detection block during a first mode of operation and to the second receive PHY block during a second mode of operation.

5. The method of claim 4, wherein the mode of operation is based, at least in part, on detecting the wireless communication signal via the first receive PHY block.

6. The method of claim 1, wherein the first analog front-end is coupled to a first antenna and the second analog front-end is coupled to a second antenna.

7. The method of claim 1, further comprising:
   configuring a first synthesizer to generate a first local oscillator signal for the first analog front-end; and
   configuring a second synthesizer to generate a second local oscillator signal for the second analog front-end.

8. The method of claim 1, wherein the wireless communication signal is a short training field.

9. The method of claim 1, further comprising:
   coupling a third analog front-end to a third receive PHY block; and
   receiving the wireless communication signal via the first analog front-end and the third analog front-end while concurrently searching for the radar signal via the radar detection block.

10. A wireless device comprising:
    a first analog front-end coupled to a first receive physical layer (PHY) block to detect a wireless communication signal;
    a second analog front-end coupled via a crossbar routing switch to a radar detection block to search for a radar signal; and
    a controller configured to cause the crossbar routing switch to couple the second analog front-end to a second receive PHY block responsive to a detection of the wireless communication signal via the first receive PHY block.

11. The wireless device of claim 10, wherein the first analog front-end is to receive a first data stream and the second analog front-end is to receive a second data stream.

12. The wireless device of claim 11, wherein the first data stream and the second data stream comprise at least a portion of a multiple-input multiple-output (MIMO) data stream.

13. The wireless device of claim 10, wherein the second analog front-end is coupled to the radar detection block during a first mode of operation and to the second receive PHY block during a second mode of operation.

14. The wireless device of claim 13, wherein the mode of operation is based, at least in part, on detecting the wireless communication signal via the first receive PHY block.

15. The wireless device of claim 10, further comprising:
a first synthesizer to generate a first local oscillator signal for the first analog front-end; and
a second synthesizer to generate a second local oscillator signal for the second analog front-end.

16. The wireless device of claim 10, further comprising:
a third analog front-end coupled to a third receive PHY block, wherein the first analog front-end and the third analog front-end are to receive the wireless communication signal while the radar detection block is to concurrently search for the radar signal.

17. A wireless device, comprising:
a transceiver;
a processor; and
a memory storing instructions that, when executed by the processor, cause the wireless device to:
couple a first analog front-end to a first receive physical layer (PHY) block;
couple, by a crossbar routing switch, a second analog front-end to a radar detection block;
search for a radar signal via the radar detection block; and
couple, by the crossbar routing switch, the second analog front-end to a second receive PHY block responsive to detecting a wireless communication signal via the first receive PHY block.

18. The wireless device of claim 17, wherein execution of the instructions causes the wireless device to further:
receive the wireless communication signal via the first analog front-end and the second analog front-end, wherein the first analog front-end receives a first data stream of the wireless communication signal and the second analog front-end receives a second data stream of the wireless communication signal.

19. The wireless device of claim 18, wherein the first data stream and the second data stream comprise at least a portion of a multiple-input multiple-output (MIMO) data stream.

20. The wireless device of claim 17, wherein the second analog front-end is coupled to the radar detection block during a first mode of operation and to the second receive PHY block during a second mode of operation.

21. The wireless device of claim 20, wherein the mode of operation is based, at least in part, on detecting the wireless communication signal via the first receive PHY block.

22. The wireless device of claim 17, wherein execution of the instructions causes the wireless device to further:
configure a first synthesizer to generate a first local oscillator signal for the first analog front-end; and
configure a second synthesizer to generate a second local oscillator signal for the second analog front-end.

23. The wireless device of claim 17, wherein execution of the instructions causes the wireless device to further:
couple a third analog front-end to a third receive PHY block; and
receive the wireless communication signal via the first analog front-end and the third analog front-end while concurrently searching for the radar signal via the radar detection block.

24. A non-transitory computer-readable storage medium storing instructions that, when executed by one or more processors of a wireless device, cause the wireless device to:
couple, by a crossbar routing switch, a first analog front-end to a first receive physical layer (PHY) block;
couple a second analog front-end to a radar detection block;
search for a radar signal via the radar detection block; and
couple, by the crossbar routing switch, the second analog front-end to a second receive PHY block responsive to detecting a wireless communication signal via the first receive PHY block.

25. The non-transitory computer-readable storage medium of claim 24, wherein execution of the instructions causes the wireless device to further:
receive the wireless communication signal via the first analog front-end and the second analog front-end, wherein the first analog front-end receives a first data stream of the wireless communication signal and the second analog front-end receives a second data stream of the wireless communication signal.

26. The non-transitory computer-readable storage medium of claim 25, wherein the first data stream and the second data stream comprise at least a portion of a multiple-input multiple-output (MIMO) data stream.

27. The non-transitory computer-readable storage medium of claim 24, wherein the second analog front-end is coupled to the radar detection block during a first mode of operation and to the second receive PHY block during a second mode of operation, the mode of operation based, at least in part, on detecting the wireless communication signal via the first receive PHY block.

28. The non-transitory computer-readable storage medium of claim 24, wherein execution of the instructions causes the wireless device to further:
configure a first synthesizer to generate a first local oscillator signal for the first analog front-end; and
configure a second synthesizer to generate a second local oscillator signal for the second analog front-end.

* * * * *